US008066088B2

(12) United States Patent
Asbeck et al.

(10) Patent No.: US 8,066,088 B2
(45) Date of Patent: Nov. 29, 2011

(54) BIOLOGICALLY INSPIRED CLIMBING DEVICE

(75) Inventors: Alan T. Asbeck, Stanford, CA (US); Sangbae Kim, Stanford, CA (US); Mark R. Cutkosky, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 630 days.

(21) Appl. No.: 11/298,306

(22) Filed: Dec. 9, 2005

(65) Prior Publication Data

US 2008/0164080 A1 Jul. 10, 2008

Related U.S. Application Data

(60) Provisional application No. 60/635,160, filed on Dec. 9, 2004.

(51) Int. Cl.
*B25J 14/00* (2006.01)
(52) U.S. Cl. ........... 180/8.2; 74/490.05; 180/8.1; 414/7; 901/30
(58) Field of Classification Search ............ 180/8.1, 180/8.2, 8.5, 8.6, 901; 446/390, 465, 356; 74/490.05; 414/7; 901/1, 30
See application file for complete search history.

(56) References Cited

U.S. PATENT DOCUMENTS

| | | | | |
|---|---|---|---|---|
| 4,643,696 A | * | 2/1987 | Law | 446/465 |
| 4,648,853 A | * | 3/1987 | Siegfried | 446/448 |
| 4,738,583 A | * | 4/1988 | Macconochie et al. | 414/735 |
| 4,784,042 A | * | 11/1988 | Paynter | 91/534 |
| 4,834,200 A | * | 5/1989 | Kajita | 180/8.1 |
| 4,878,875 A | * | 11/1989 | Pin-Hung et al. | 446/356 |
| 5,255,753 A | | 10/1993 | Nishikawa et al. | 180/8.6 |
| 5,297,443 A | * | 3/1994 | Wentz | 74/490.04 |
| 5,720,646 A | * | 2/1998 | Shannon et al. | 446/465 |
| 5,807,011 A | | 9/1998 | Hong et al. | 403/62 |
| 5,820,441 A | * | 10/1998 | Pracas | 446/354 |
| 6,412,844 B1 | | 7/2002 | Hendzel | 294/67.31 |

OTHER PUBLICATIONS

Ang, Jr. Marcelo "$2^{nd}$ Asian Conference on Robotic & Applications (ACRA) Beijing" (1994).
"Astronaut Scout Wall Walking Robot" Space Toys www.spacetoys.com/cart.php?session_id=110254155780&item=95, (Dec. 8, 2004).
Knight, Will "Robotic Rock-Climbre Takes It's First Steps" (2004) www.newscientist.com/news/news.jsp?id=ns99995090.
"Biggalo, The Amazing Wall Climbing Robot" (2003) www.engr.uvic.ca/~pmauro/desc.html.

(Continued)

*Primary Examiner* — Anne Marie M Boehler
(74) *Attorney, Agent, or Firm* — Lumen Patent Firm

(57) ABSTRACT

A biologically inspired climbing device with toes and spines is provided. The device has toes capable of moving independently from each other. Each toe distinguishes a compliant linkage, which has non-compliant parts and compliant parts. Spines are distributed over each of the toes. The spines have a diameter that is less than or equal to a diameter of an asperity of a surface. The toes with spines could be arranged into one or more feet. The feet could then be organized in legs enabling the device to climb a surface in a gait pattern. The device uses low power and is quiet, leaves no traces or tracks behind, works well on smooth, rough, uneven, porous and dirty surfaces, and is able to carry and support its own body weight.

11 Claims, 12 Drawing Sheets

OTHER PUBLICATIONS

Xiao, Jizhong et al. "Controller Design for an Autonomous Wall-Climbing Micro-Robot Based on TMS320LF2407 DSP Chip", (Dec. 9, 2005).

"SpyBot Climber" I Offer, www.ewanted.com/i/SpyBot-Climber-2479039, Dec. 8, 2004.

Dai, Zhendong et al. "Roughness-Dependent Friction of the Tarsal Claw System in the Beetle Pachnoda Marginata (Coleoptera, Scarabaeidae)" (2002) the Journal of Experimental Biology 205, p. 2479-2488.

"Foot Design Ideas Meeting" (2003) http://bdml.stanford.edu/twiki/bin/view/Main/FootDesignIdeas.

* cited by examiner

Figure 4A 410  Figure 4B 420

Figure 8A 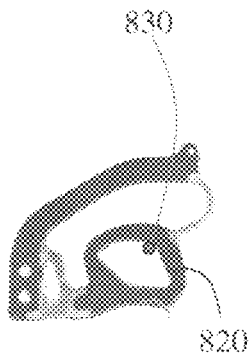 Figure 8B 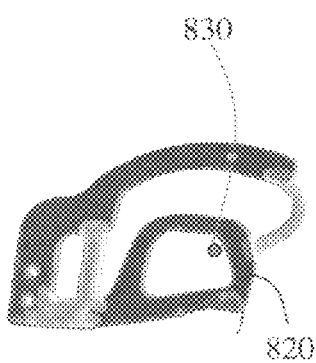 Figure 8C 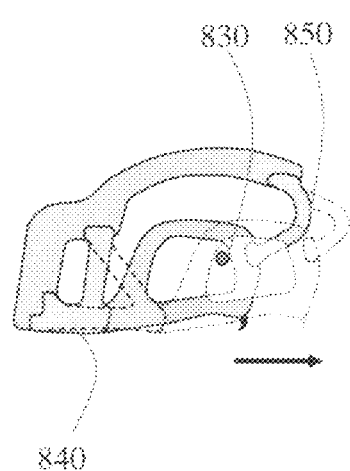

BIOLOGICALLY INSPIRED CLIMBING DEVICE

CROSS-REFERENCE TO RELATED APPLICATION

This application is cross-referenced to and claims benefit from U.S. Provisional Application 60/635,160 filed Dec. 9, 2004, which is hereby incorporated by reference.

STATEMENT REGARDING FEDERALLY SPONSORED RESEARCH OR DEVELOPMENT

This invention was supported in part by the Defense Advanced Research Projects Agency (DARPA) under Grant Number N66001-03-C8045. The U.S. Government may have certain rights in the invention.

FIELD OF THE INVENTION

This invention relates generally to devices and methods to climb over surfaces. More particularly, it relates to a devices and methods for climbing or clinging without using suction or vacuum methods and without using sticky materials such as glue.

BACKGROUND OF THE INVENTION

In recent years, there has been considerable progress in small, legged robots that can run rapidly and stably over rough terrain. Climbing and maneuvering on a vertical surface presents a more difficult challenge, which robots are just beginning to address. For applications such as surveillance or the inspection of hard-to-reach locations, one would like to have small robots that can climb a variety of hard and soft surfaces unobtrusively and cling for extended periods of time without high power consumption.

Previously developed climbing robots have generally employed either suction cups, magnets, or sticky adhesives to cling to smooth vertical surfaces such as windows and interior walls. None of these approaches is suitable for porous and typically dusty exterior surface such as brick, concrete, stucco or stone. A recent development employing a controlled vortex to create negative aerodynamic lift has been demonstrated on brick and concrete walls (www.vortexhc.com). However, this approach consumes significant amount of power, whether the robot is stationary or moving, unavoidably generates noise, and is difficult to adapt to non-smooth surfaces such as window ledges, corners, and corrugated surfaces. Still other robots employ hand and foot holds in the manner of a human climber.

Observing animals that exhibit scansorial (vertical surface) agility, one can find a variety of methods employed. Larger animals such as cats and raccoons employ strong claws that penetrate wood and bark surfaces. Tree frogs and many insects employ sticky pads. Geckos and some spiders employ large number of hairs that achieve adhesion via van der Waals forces on almost any kind of surface. Other insects, arthropods and reptiles employ small spines that catch on fine asperities. Accordingly, it would be considered an advance in the art to design biologically inspired climbing devices and mechanism.

SUMMARY OF THE INVENTION

The present invention is a biologically inspired device that has toes and spines for climbing on a surface or clinging onto a surface. The device includes a plurality of toes that are capable of moving independently from each other. Each toe distinguishes a compliant linkage, which has a plurality of non-compliant parts and one or more compliant parts. In one example, the compliant linkage includes a plurality of compliant parts. The linkage further distinguishes an un-deflected position and a deflected position. Each toe could include, either as an intrinsic (passive) property of the design or explicitly added to the design, an overload mechanism and/or a disengagement mechanism.

A plurality of spines is distributed over each of the toes and attached to at least one of the non-compliant parts of a toe. In one example the spines are attached to a plurality of non-compliant parts of a toe. The spines have a diameter that is less than or equal to a diameter of an asperity of a surface. In case the spines are tapered they would have a tip diameter less than or equal to the diameter of the asperity of the surface. In some cases, spines are capable of moving independent from each other within a toe. The movements of the toes and spines would increase the probability of spines finding an asperity to latch or cling onto. The device could further include an under-actuated mechanism or a tendon capable of engaging and disengaging the spine(s), toe(s) or any combination thereof.

In the example of a climbing robot, the toes with spines could be arranged into one or more feet. The feet could then be organized in legs enabling the robot to climb a surface in a gait pattern. The under-actuated mechanism or a tendon could then also be attached to each foot.

Unlike existing wall-climbing robots that rely on noisy suction or vacuum methods, devices of this invention require low power and are quiet. Unlike conventional wall-climbing robots that use sticky substances such as glues, devices of this invention usually leave no traces or tracks behind. More importantly, devices of this invention work well on porous and dirty surfaces, overcoming a significant limitation of prior approaches. In general, a robot according to this invention has the ability to climb on (or cling onto) smooth, rough or uneven surfaces such as concrete, stucco, sandstone, brick, and similar building walls, interior walls, or drywalls. Furthermore, a robot utilizing the mechanisms of the present invention is able to carry and support its own body weight.

Robots utilizing the present invention would be highly desirable in many practical applications such as surveillance robots, toys, military applications, etc. Moreover, the design and mechanisms could be used as climbing aids for humans and to other applications that require high adhesion on hard, slightly rough surfaces such as concrete, stucco, or cut stone and even smoother surfaces. Furthermore, the design and mechanisms could also be used to position or move devices on walls, angled or vertical surfaces. For example, the feet and/or toe mechanisms could be used to position and/or move a billboard, cling to the outside of a spacecraft, make a clamping mechanism that can adhere to these surfaces and can support other objects, include feet for a robot to enable it to climb impenetrable surfaces as well as penetrable surfaces.

BRIEF DESCRIPTION OF THE DRAWINGS

The objectives and advantages of the invention will be understood by reading the following detailed description in conjunction with the drawings, in which:

FIGS. 6-8A-C show different examples of disengagement and/or overload protection mechanisms according to the present invention.

DETAILED DESCRIPTION

A. Spines in Nature

Figure 1:
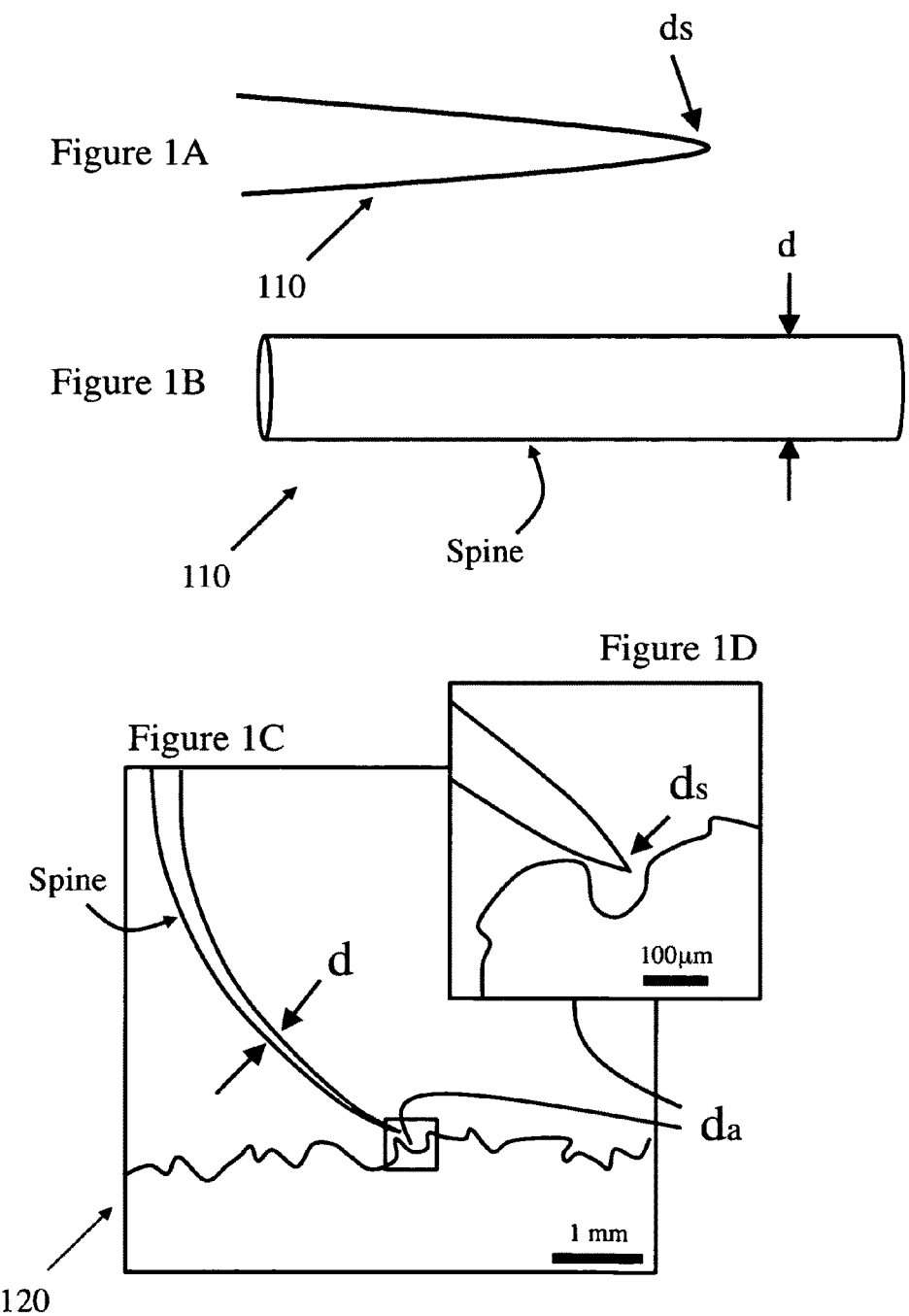
FIGS. 1A-D show examples of spines according to the present invention. Example 110 shows a spine with diameter d and a tip diameter $d_s$. Example 120 shows a spine with diameter d and a tip diameter $d_s$ relative to a surface with asperity $d_a$.

Insects and arthropods that climb well on man-made and natural surfaces often use legs equipped with large numbers of small, sharp spines. Even geckos that frequently rock surfaces such as cliffs and caves have small claws on each toe in addition to their dry adhesive structures. Unlike the claws of a cat, the small spines or claws do not need to penetrate the surface. Instead, they exploit small asperities (bumps or pits) on the surface. Several studies in the biology literature have considered the problem of spine/surface interaction. For example, Dai et al. (2002) presented a planar model of spine/asperity contact and computed the maximum load per spine as a function of spine strength, relative size of the spine tip versus that of an asperity, and coefficient of friction (see Dai et al. (2002) in a paper entitled "Roughness-dependent friction force of the tarsal claw system in the beetle *Pachnoda marginata* (Coleoptera, Scarabaeidae)" and published in *The Journal of Experimental Biology* 205:2479:2488). As expected, for rough surfaces the mechanical strengths of the spine and asperity become the limiting factors; for smoother surfaces friction is more important and the ability to pull in toward the surface is much reduced.

B. Spine Scaling for a Climbing Robot

Given the observed relationship between spine or claw size and animal size, one is led to ask: For a climbing robot of a given size, how large should the spines be? If one considers a robot that weighs approximately 0.5 Kg, one might expect spines or claws similar to those seen in squirrels or large climbing lizards. However, this argument ignores the point that spines made of hardened steel are much stronger and stiffer than natural spines and can therefore be smaller while supporting a comparable load.

Indeed, if the strength of the spine/asperity contact were not a constraint, one should make the spines as small as possible. The reason behind this argument is that many natural surfaces, and some man-made surfaces such as concrete and stucco, have an approximately fractal surface topography so that characteristic surface features (asperities) can be found over a wide range of length scales. As shown in FIGS. 1A-D, for spines of a certain tip diameter, $d_s$, and for the purpose of this invention, we are interested in asperities of average diameter $d_a \geq d_s$ to obtain effective interlocking ($d_a$ is the diameter of an asperity). Given the self-similar nature of fractal surfaces, one can expect the density of such asperities to grow at least as $1/d_a^2$ per unit area of the wall. This invention can also be used on very non-fractal surfaces, so long as the spines have tip diameters less than the diameters of asperities on the surface.

In practice, there is a lower limit to the useful spine dimensions. We have found that when steel spines catch on asperities on concrete or stucco, the contact typically fails in one of three ways:

(1) Plastic failure of the base of the spine in bending, (2) Excessive elastic rotation of the spine tip causing it to slip off the asperity, or (3) Brittle failure of the asperity itself.

In each of these cases, if we take a dimension such as the spine tip diameter, $d_s$, as a characteristic dimension and scale everything uniformly, then the maximum load of the spine/asperity contact increases as $d_s^2$.

The spine/asperity contacts have three primary failure modes. The first mode of failure is due to the tensile stress at the base of the spine, causing the spine to plastically deform. Maximum stress on a cylindrical cantilever beam is:

$$\sigma_{max} = \frac{Mc}{I} = \frac{32fld_s}{\pi d_s^4} \propto \frac{1}{d_s^2} \left( \text{if } \frac{l}{d_s} = const \right)$$

$$M = fl, c = \frac{d_s}{2}, I = \frac{\pi d_s^4}{64}$$

$f$ = force exerted on tip of the spine
$d_s$ = diameter of cross section of spine
$l$ = spine length The second mode of failure is excessive spine tip rotation. Deflection angle at the tip of cantilever beam is:

$$\theta = \frac{fl^2}{2EI} = \frac{32fl^2}{E\pi d_s^4} \propto \frac{1}{d_s^2} \left( \text{if } \frac{l}{d_s} = const \right)$$

The third mode of failure is that the asperity itself may break off or fail in shear. Shear stress failure is:

$$\sigma_{max} = \frac{f}{A} = \frac{4f}{\pi d_a^2} \infty \frac{1}{d_s^2} (\text{if } d_a = d_s)$$

The details of the asperity failure will depend on whether the material is brittle and whether cracks or defects are present. However, the strength of the asperity is generally expected to increase as the square of asperity diameter.

As a person of average skill in the art would appreciate, as spines become smaller the climbing robot can ascend smoother surfaces because the density of useable spine/asperity contacts increases rapidly. However, one would need a larger number of spines because each contact can sustain less force. To make use of a larger number of spines, the first two design principles behind climbing with spines are therefore:
(1) Ensure that as many spines as possible will independently find asperities to attach to, and
(2) Ensure that the total load is distributed among the spines as uniformly as possible.

The climbing device of this invention has feet (hands would be equivalent) and toes (fingers would be equivalent) that embody these design principles. In addition, as with any climbing mechanism, it is important to keep the center of gravity as close to the wall as possible and to avoid imposing any forces or moments at the feet that could lead to premature detachment. The features of a climbing device according to the present invention that achieve these effects are also described.

C. Foot and Toe Design: Promoting Attachment and Load Sharing

Figure 2:
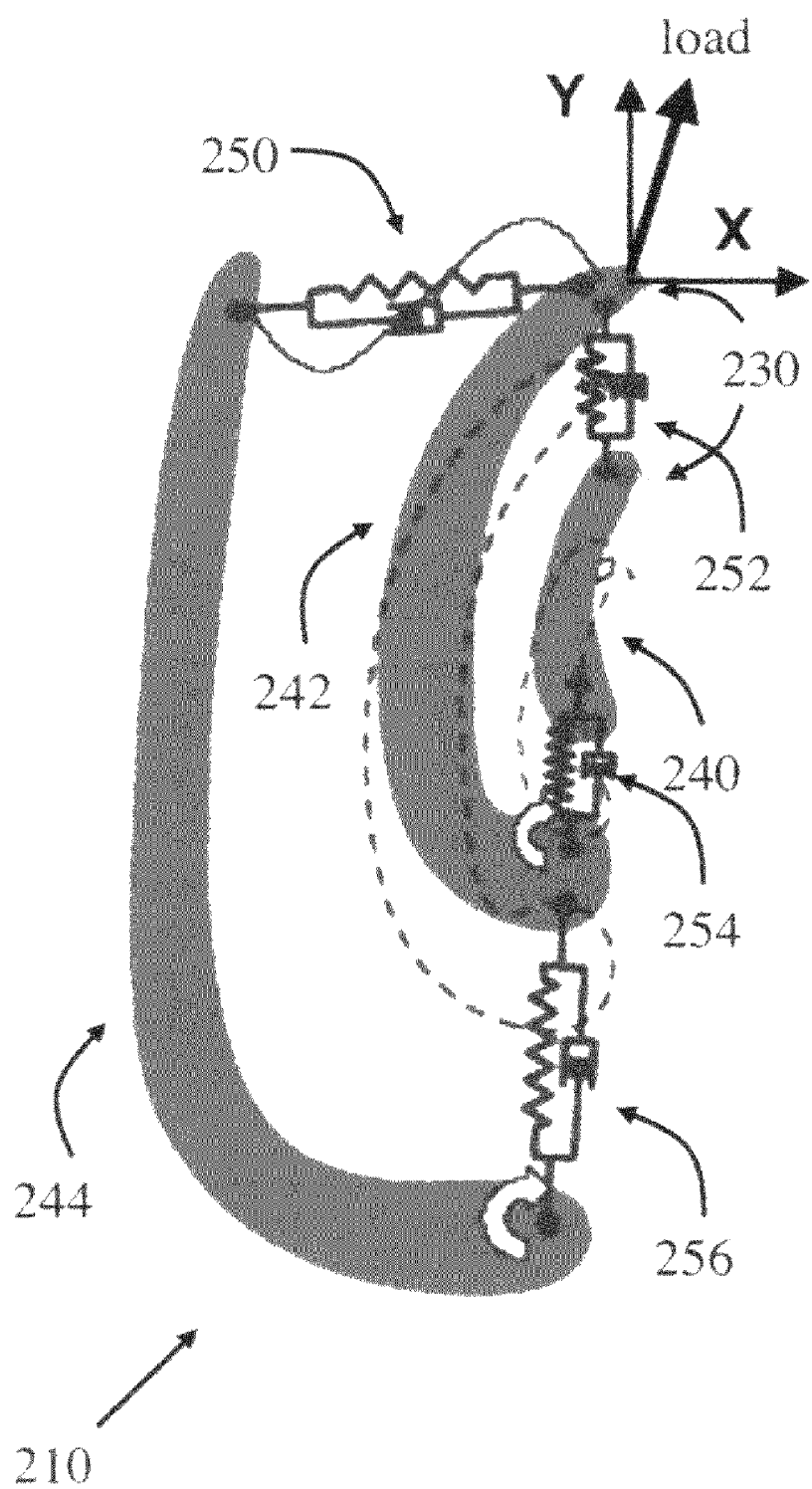
FIG. 2 shows an example of a compliant linkage toe design according to the present invention.

FIG. 2 shows a schematic 210 of a compliant suspension linkage for one toe of the climbing device. In this example, the compliant linkage utilizes a combination of hard materials (non-compliant) and soft (compliant) materials. More specifically, the toe distinguishes three hard materials 240, 242, and 244 that are connected with soft materials 250, 252, 254 and 256. As shown herein the number of non-compliant and compliant parts as well as the connections between the two parts could be varied and depends on the toe design and requirements for the climbing robot or other applications. It is noted that instead of having a toe design made of different hard and soft materials, one could also make a toe out of one type of material. In the latter case, one would distinguish non-compliant and compliant parts (or portions of the same toe) that vary in dimensions (e.g. thickness). It is also possible to combine these two approaches.

Figure 3:
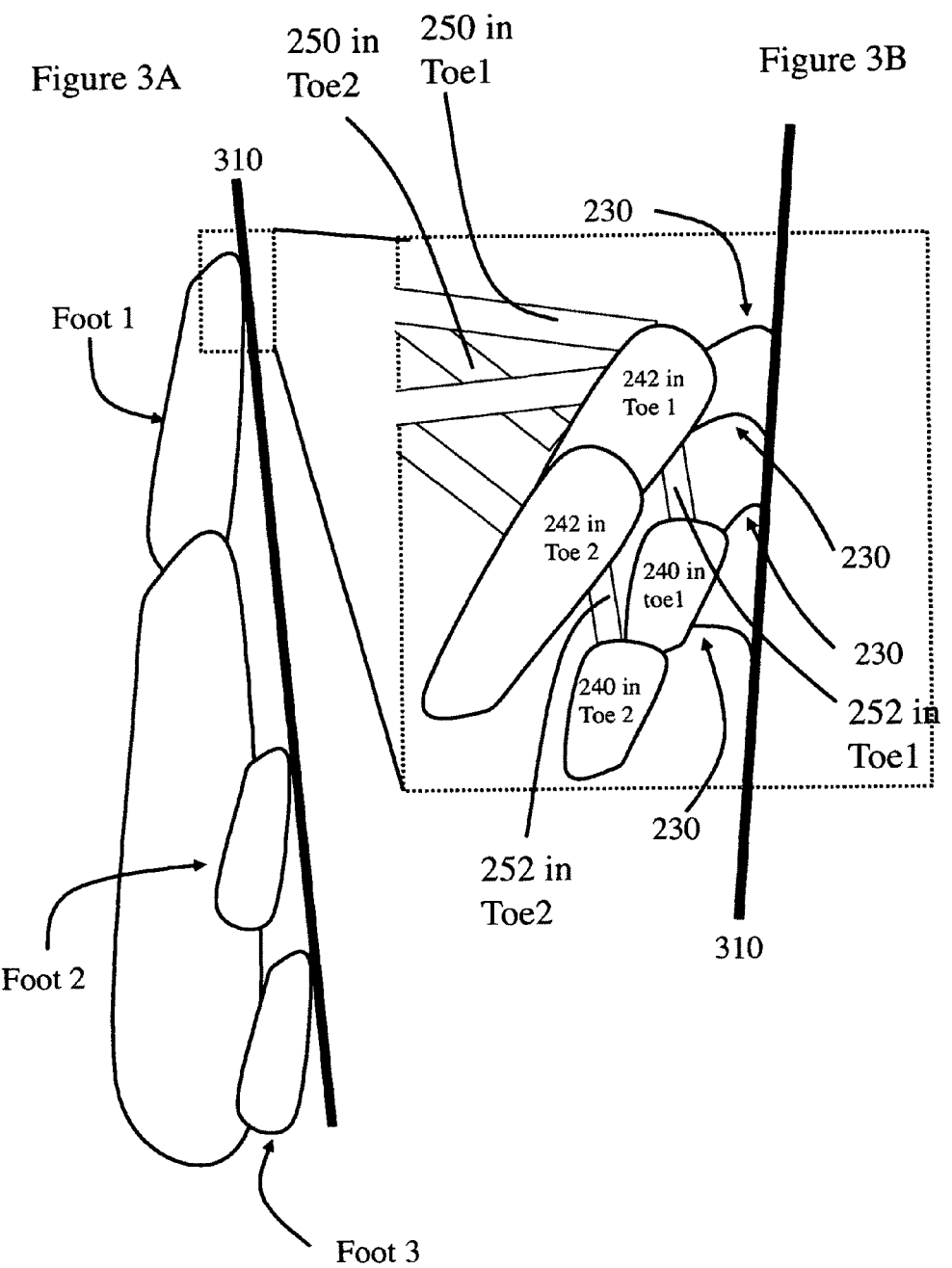
FIGS. 3A-B show examples of a robot climbing whereby several spines are engaging asperities on a concrete surface 310 according to the present invention.

Each spine 230 or spine group per non-compliant element is compliantly supported with respect to its neighbors so that every spine (or spine group) could find a useful asperity (or asperities) onto which to latch as shown in FIGS. 3A-B. In the example in FIG. 2, if the spine attached to 240 grabs onto an asperity, then the spine attached to 242 is forced towards the wall reaching toward an asperity. However, the spines on the neighboring toes are not necessarily affected. If the spine attached to 242 grabs onto an asperity, the spine on 240 is not necessarily forced towards the wall. In general, a spine or spine group on any toe could force spines on other toes, e.g. neighboring toes, towards the wall. All these movements of the toes are important to maximize the probability that many spines on each foot will find asperities of surface 310 and share the total load.

Figure 4:
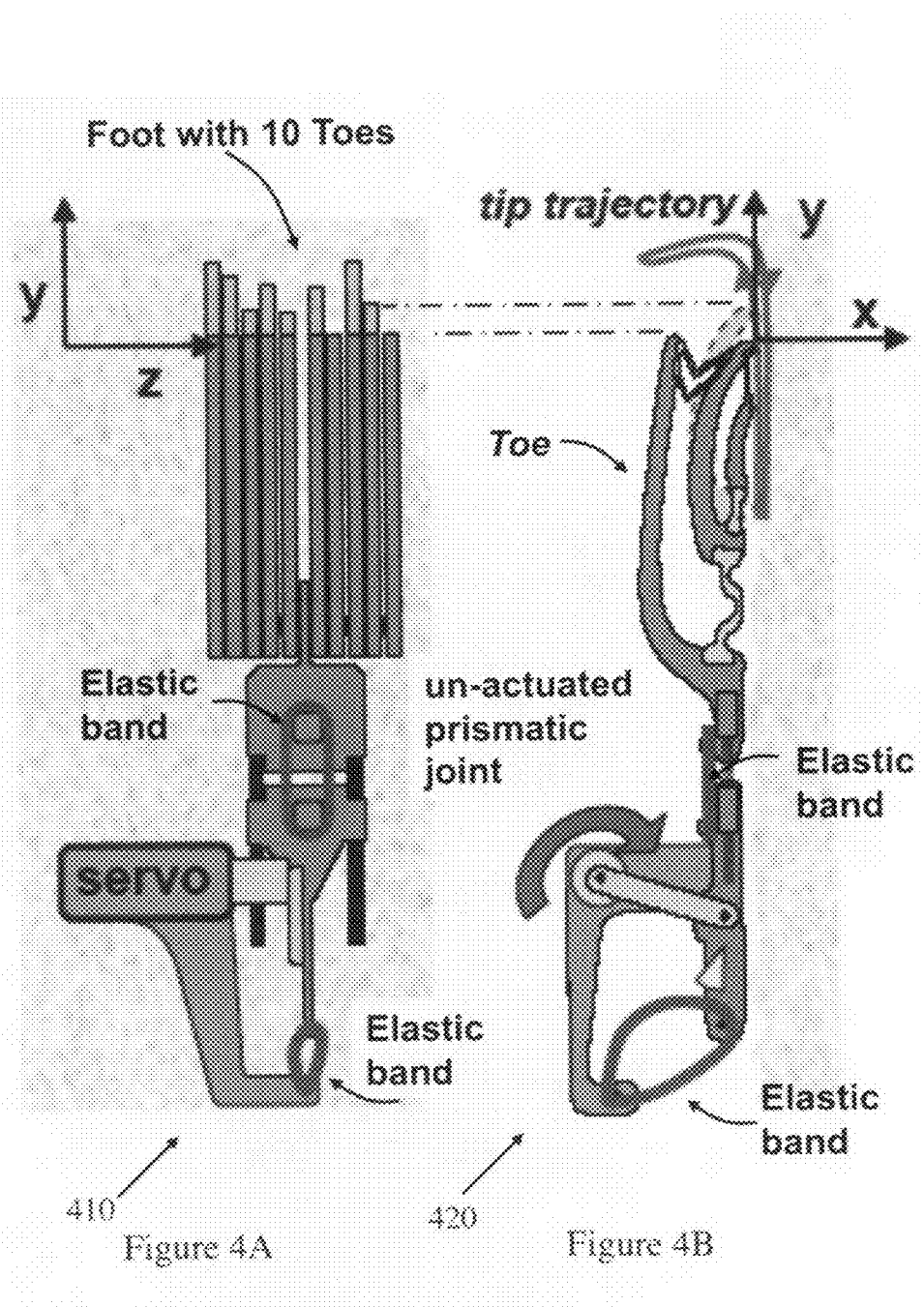
FIGS. 4A-B show a plan 410 view and side 420 view of one robotic foot containing ten toes, each toe is like the toe shown in FIG. 2. The figure shows that the toes can deflect independently of each other. In addition, the entire foot can displace in the distal (y) direction due to an unactuated prismatic joint. The attachment/detachment trajectory of the foot as illustrated could be an upward (+y) motion, followed by lift-off motion (−x), touchdown (+x), and a downward pull (−y). It is noted that the upward (+y) and liftoff (−x) motions are part of the disengagement motion to remove the foot from the wall. The attachment trajectory just includes the touchdown (+x) and downward pull (−y). The sequence of motions could be accomplished using an under-actuated mechanism consisting of a single rotary RC servo-motor and an elastic band that is initially loose and becomes taut as the leg moves upward. A hard stop functions to remove the leg from the wall when the servo rotates to the upward position (the end of the arm moves in the (+y) direction). When the servo rotates to the upward position, the elastic band becomes taut and pushes the leg against the hard stop. When the servo rotates to the downward position ((−y) direction), the elastic band becomes loose and the leg rotates freely about the joint where it is connected to the servo arm.

Each robotic foot contains a set of compliant toes with spines. In the example of FIG. 4, the number of toes is 10. In general the number of toes could be in the range of two to millions or more per foot. The number of spines per toe could range from one to more than 100, and is predominantly dependent on the spine characteristics, total number of toes for the climbing mechanism/device/robot, type of asperity of the surface, and weight and size of the climbing mechanism/device/robot. The spines are preferably positioned at the non-compliant parts, such as 240 and 242, and particularly at the distal end of each these linkages as shown in FIG. 2. A cable or a tendon (not shown) can be employed to actively engage or disengage the spines. Such as tendon could be attached to the foot or to each toe. FIGS. 9-12 shows variations to these engagement and disengagement mechanisms. In the example of FIG. 2, non-compliant element 244 connects to a supporting structure for the toes.

Once a toe makes contact with a surface or an asperity a load is applied to its toe linkage. As a result the toe linkage changes position from an un-deflected position, which is shown in dotted lines and superimposed in 210, to a deflected position as shown in FIG. 2. The positional change depends e.g. on the stiffness characteristics of the compliant materials and mechanical interactions with the connected non-compliant materials as well as the applied load. For example, compliant material 250 has preferably low stiffness in the −x direction when the linkage is under compression and a higher stiffness when the linkage is under tension. Compliant material 250 also preferably provides damping of the motion of non-compliant element 242. Compliant material 252 has preferably similar properties to compliant material 250. Compliant material 254 primarily allows for rotational flexure of the proximal spine (bottom 230). Compliant material 256 permits travel in y direction.

For small deflections, the linear and rotational stiffness of each spine in the (x,y) plane can be modeled using a 3×3 stiffness matrix, K, taken with respect to a coordinate system embedded in the spine (see FIG. 2):

$$\begin{bmatrix} k_{xx} & k_{xy} & k_{x\theta} \\ k_{xy} & k_{yy} & k_{y\theta} \\ k_{x\theta} & k_{y\theta} & k_{\theta\theta} \end{bmatrix}.$$

At initial contact, we require that $k_{xx}$ be very small for displacements in the −x direction, so that there is little force that tends to push other toes back from the wall and cause them to disengage. Compliant part 250 at the end of the toe are designed to buckle so that they have a very small stiffness for −x deflections and a higher stiffness for tensile loads (+x direction), once the climbing robot starts to transfer part of its weight to the toe. This higher stiffness for tensile loads is preferably used to support the load of the robot pulling in the (−x) direction, and also to disengage the spine(s) from the asperity (asperities) during a later disengagement motion. At the same time, $k_{yy}$ should be moderate and, more importantly, $k_{xy}$ should be preferably small and non-negative so that stretching in the y direction does not cause any retraction of the spine in the x direction. Small negative values of $k_{xy}$ are acceptable, however. Finally, the $k_{x\theta}$ and $k_{y\theta}$ terms should be small and, preferably, negative so that displacements in the x or y direction are not accompanied by anticlockwise rotations in the (x, y) plane that would lead to premature disengagement. Small positive values of the $k_{x\theta}$ and $k_{y\theta}$ terms are also acceptable, however.

The toe linkage mechanism shown in FIG. 2 was modeled in the Working Model™ software (MSC Inc.) and the various linear and rotational stiffness elements were adjusted until the model matched deflections obtained when applying small loads and measuring the corresponding displacements in bench-top tests. The results are summarized in Table I.

TABLE I

STIFFNESS AND DAMPING PARAMETERS FOR TOE LINKAGE

| Location numbered in FIG. 2 | Parameter in kinematic model<br>k = linear stiffness element<br>c = linear damping element<br>$k_f$ = rotational stiffness element |
|---|---|
| 252 | k = 60 N/m<br>c = 0.1 Ns/m |
| 256 | k = 60 N/m<br>c = 0.1 Ns/m<br>$k_f$ = 0.005 Nm |
| 250 | k = 90 N/m in tension<br>k = 0.005 N/m in compression<br>c = 0.02 Ns/m |
| 254 | k = 100 N/m<br>c = 0.001 Ns/m<br>$k_f$ = 0.001 Nm |

The toe linkage mechanism of FIG. 2 is designed so that initial contact at the inner, or proximal, spine actually forces the distal spine slightly outward (+x direction) to increase the probability that it will also contact an asperity. Once one or both spines have contacted the wall, the toe can apply a force that is mainly vertical, with a small inward (+x) component to help the robot climb.

An important observation of agile scansorial animals like geckos is that they employ multi-level conformability (e.g. lamellae, toes, and limbs) and redundancy (multiple pads per toe, multiple toes per foot, multiple feet in contact) for reliable climbing. Similar principles have been found necessary for the robotic climbing mechanism of this invention. To employ multi-level conformability, the entire foot mechanism can be mounted on a prismatic joint with an elastic suspension (e.g. an elastic band) that allows it to move up to 1 cm in the distal (+y) direction as shown in FIGS. 4A-B. In addition, the entire foot assembly is spring loaded by a second elastic element behind the pivot, where it is connected to a rotary RC servomotor. The result is an under-actuated R-R-P serial kinematic chain that traces a loop trajectory, as shown in FIGS. 4A-B, when the servomotor rotates back and forth. In one example of a climbing robot designed by the inventors, the best elastic elements were found to be about 6.4 mm diameter elastic bands commonly used for dental braces.

D. Body Design: Promoting Load Sharing and Stability

Figure 5:
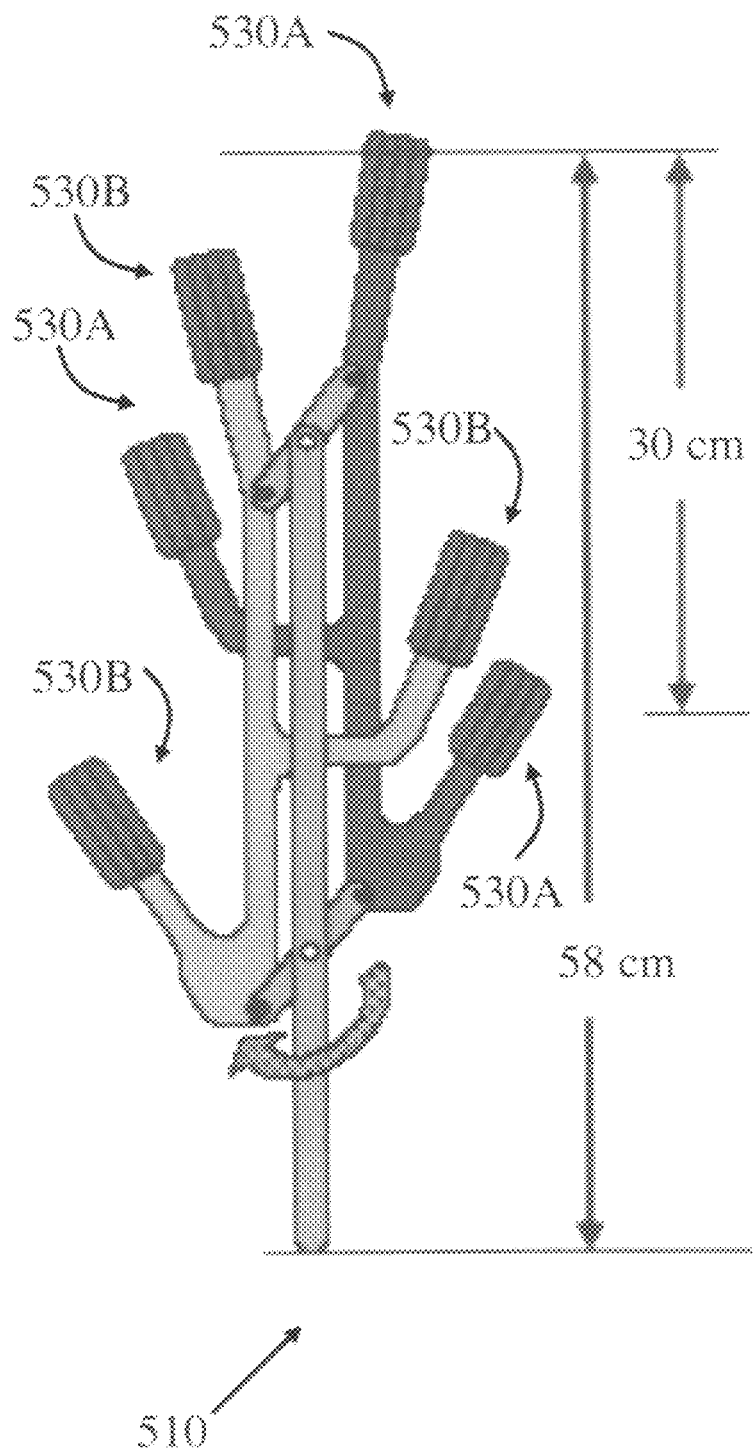
FIG. 5 shows a plan view 510 of a climbing robot according to the present invention. Each set of three legs is attached to a mechanism that allows the robot to "ratchet" its way up the wall with an alternating tripod gait. A long tail could help to reduce the pitching moment. The center of mass (COM) is ideally within the polygon of contacts, to minimize yawing rotations in the plane of the wall.

Moving from the foot to the body as a whole, 510 in FIG. 5 shows that the robot could utilize an alternating tripod gait, as found in climbing insects. The climbing robot could have two body halves each having three feet with multiple toes as discussed herein (see FIG. 2-4). In the example of FIG. 5, the climbing robot has two body halves, each having three feet, 530A and 530B, respectively. At any time, the climbing robot in the example of FIG. 5 could be clinging to a surface by three feet. As a person of average skill in the art would readily appreciate, the number of legs, feet and toes could be varied and is not limited to the examples provided herein. Furthermore, the type of gait or climbing techniques could also be varied and is not dependent on a tripod gait.

While one of the concerns for vertical climbing is to avoid pitching back from the plane of the wall, it is also important to maintain rotational stability in the plane of the wall. The center of mass (COM) of the climbing robot preferably lies within a polygon of contacts at all times. Also, as observed in climbing insects and reptiles, the legs have a slight inward pull, toward the centerline of the robot. This arrangement reduces the upsetting moments (in the plane of the wall) about the center of mass, should one of the legs momentarily lose its grip.

E. Disengagement and Overload Mechanisms

Figure 6:
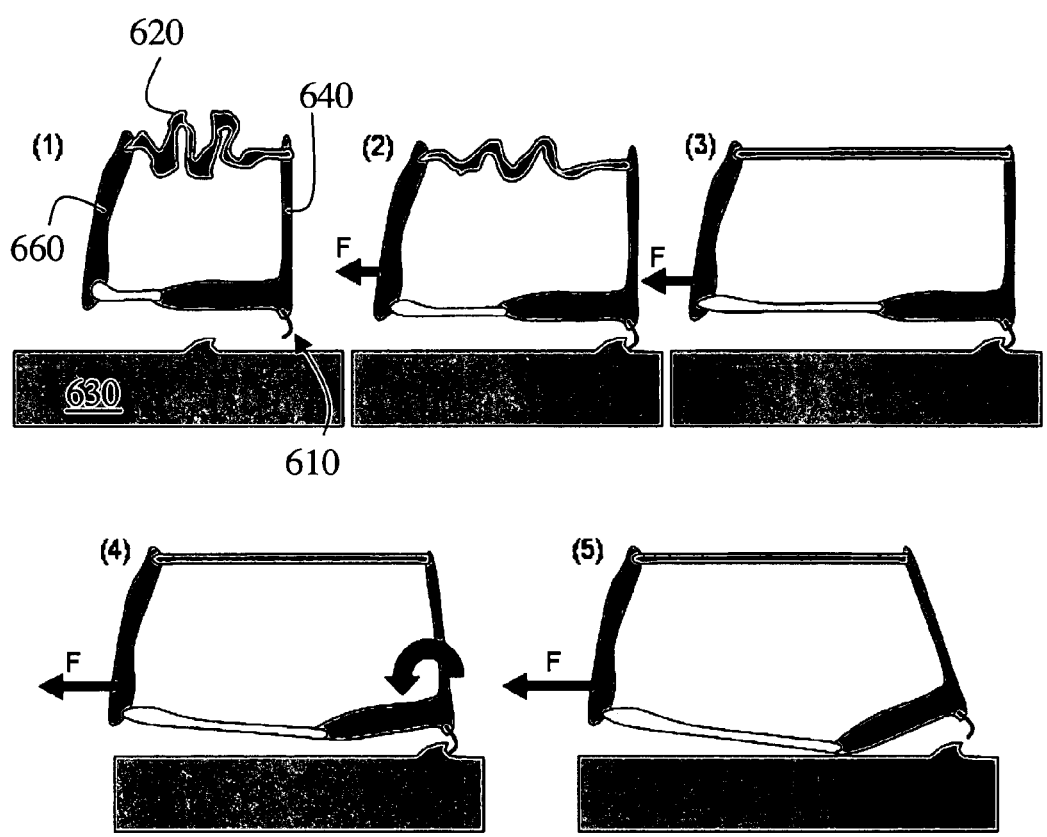

In some cases, especially when adapting the design and mechanisms of the present invention to heavier and larger robots, it would be desired to include a disengagement and/or overload mechanism in the toe design. The spine 610 of a toe would preferably disengage when the toe reaches a certain stretch position as is illustrated in FIG. 6. The disengagement mechanism could be accomplished by having an inextensible linkage 620 that attached to the top part of the toe. In (1), the toe approaches surface 630. In (2), spine 620 has hooked onto a bump on the surface, and a small load F is being applied to the toe, shown by the arrow. In (3), the load F has increased to the point where the top member 620 has fully elongated. In (4), an additional load is applied again, further increasing F, causing the front part 640 of the toe to rotate backwards as indicated by the curved arrow. In (5), the spine has disengaged from the wall. This could either occur by the spine rotating back enough that the angle change is enough to make it disengage, or by the back part of the member 650 pushing down on the surface and resisting further rotation, so that the spine is forcibly lifted off the surface vertically.

Figure 7:
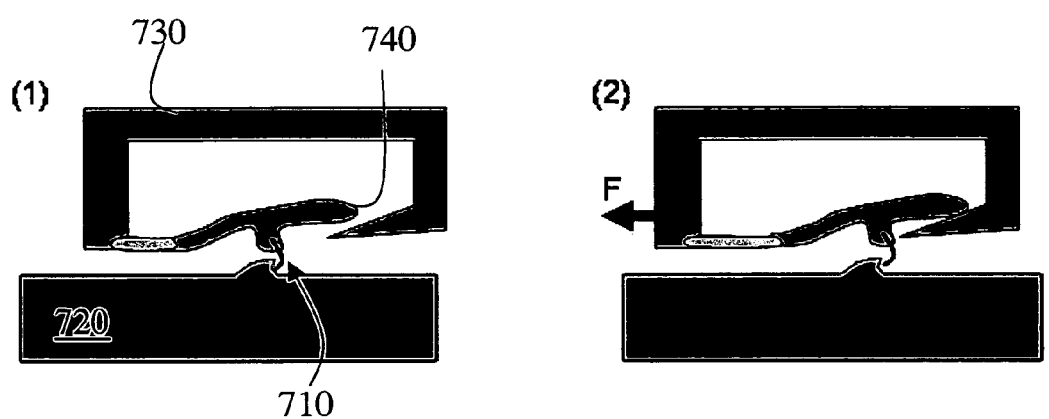

In another embodiment shown in FIG. 7, one could also have a disengagement mechanism that pulls the spine 710 off the wall 720 perpendicularly (i.e. vertically in FIG. 7) instead of rotating it. FIG. 7 shows a toe mechanism with a wedge-shaped part of the outer member 730 that slides between the inner member 740 and the wall (compare (1) and (2)), prying it vertically in the figure as shown up and off the bump, thereby disengaging the spine.

The disengagement/overload solutions implemented in FIGS. 6-7 employ overload stops for elastic toes with a passive end-of-travel mechanism such that the spine ideally automatically disengages from the surface if the overload condition is reached. FIGS. 8A-C shows an alternate design of a disengagement/overload mechanism for toe 810. In this example, the toe can extend forward (see right-hand example and arrow) until non-compliant part 820 with the opening/hole in it hits pin 830, which is attached to the foot. Such a construction would cause the toe to disengage upon excessive extension. Essentially, the toe stretches until pin 830 through the hole in the middle of the toe hits the back of the hole (back of the enclosure), which causes a large disengaging moment so the toe rotates backwards about the spine/wall contact until it lifts off the wall. The pin can also serve to merely restrict further forward motion of the toe, to prevent damage to the compliant parts 840, 850 even if it does not cause the toe to disengage from the surface.

F. Parameters

The following is a list of parameters that could be used in the toe design, foot design and/or robot design:
- Number of legs: 2-20, or more.
- Number of feet: 2-20, or more.
- Number of toes per foot: 2-1000, or more.
- Number of Spines per toe: 1-100, or more.
- Length of spine: 10 cm or larger down to 20 micrometers or less.
- Diameter of spine: 1 cm or more down to 0.5 micrometers or less.
- Diameter of tip of spine: 1 cm or more down to 0.5 micrometers or less.
- Material of spine metal, plastic, ceramic or any type of hard or non-compliant material.

Spine shape: Any shape, but in particular straight, curved, which could be tapered or not tapered.

The number of hard (non-compliant) parts depends on the number of spines per toe. For example, if you have 100 spines per toe, there could be several hundreds of non-compliant parts in the toe. The number of soft (compliant) parts also depends on the number of spines per toe.

The type of materials could be:

For non-compliant parts plastic, metal, ceramic, or any material that does not deform very much. In a particular embodiment, a hard urethane of 75 Shore-D hardness could be used.

For compliant parts any material that is compliant either by material characteristics or dimensions. For example, rubber, polyurethane, plastic, metal (if you make it thin enough), or the like. In a particular embodiment, a soft urethane of 20 Shore-D hardness could be used. Soft urethane flexures provide both elasticity and viscoelastic damping. The inventors of this invention have found that soft urethane flexures permit greater extensions without failure than miniature steel springs.

It is noted that $D_a$ as referred to herein represents an approximate maximum value of $D_a$. Since the surfaces are all approximately fractal, all of them will have asperities of size smaller than these values, down to the smallest useable asperity sizes (<0.5 micrometer). The quoted values below are approximately the largest reasonable values for these surfaces. If a range is stated, it is intended to mean that there are different types of that material, and the different types have different maximum asperity sizes. For example, tree bark can be quite rough like an oak tree ($D_a$ of about 1 cm) or can be very shiny and smooth ($D_a$<10 micrometer). The following are some examples of surface with asperities:

Weathered painted exterior surfaces could have a $D_a$ about 1-5 micrometer and smaller.

Tree bark could have a $D_a$ of about ~1 cm to 10 micrometers.

Stucco could have $D_a$ of about 3 mm to 0.1 mm.

Concrete (including cinder block, cast concrete, etc.) could have a $D_a$ of about 2 mm to 20 micrometers.

Cut or machined stone could have a $D_a$ of about 1 mm to 10 micrometers.

Brick could have a $D_a$ of about 2 mm to 10 micrometers.

Painted interior drywall could have a $D_a$ of about 10 micrometers to 0.5 micrometer.

All of these surfaces can also be painted or unpainted. If a surface is painted, the paint may fill in many of the smaller asperities, so there may only be asperities approximately larger than 50 micrometers or so and less than approximately 5 micrometers. In other words, there may be very few asperities between 50 micrometers and 5 micrometers. Unpainted surfaces will generally have a continuous range of asperity sizes.

The characteristic stiffness $k_{yy}$, i.e. the force required to move a spine relative to its forward displacement (e.g. in the +y direction in FIG. 2), could vary depending on the desired load per spine, the number of spines, the desired forward motion of the toe or spine (which can be related to the asperity density on the wall), and possibly other factors. As such, there can be quite a wide range of desired characteristic stiffnesses $k_{yy}$. One example was discussed herein with reference to Table I, which was suited for the characteristics of the climbing robot in that example. Similarly, the characteristic stiffness $k_{xx}$, i.e., the force required to move a spine relative to its displacement in the direction normal to the surface (the −x direction in FIG. 2), depends on the number of spines per foot, the roughness of the surface, and possibly other factors. As such, there can also be quite a range of desired stiffnesses for $k_{xx}$.

G. Variations

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, the number of hard and soft structures in a compliant linkage could be varied to less or more than the example of FIG. 2. Also there are many possible mechanisms by which the spines could be made to move in the desired manner, including, but not limited to, (i) using non-compliant parts that are connected by rotary compliant joints that are not extensible, (ii) mechanisms that use a fluid- or air-filled cavity to provide the desired compliances in either or both directions, (iii) or any other mechanism or combinations of mechanisms. In another variation, compliance could be adapted in normal and tangential direction for higher load and different stroke lengths. Furthermore, the foot width could be increased and/or length could be decreased to avoid interference. Yet another variation is to have a heterogeneous spine/toe population for wide range of surfaces. Furthermore, the spines could be distributed over the foot in any type of pattern. Still another variation is to have a tail, which reduces the "pull-in" forces needed at the front limbs to overcome the pitching moment produced by gravity acting at the center of mass.

Figure 9:
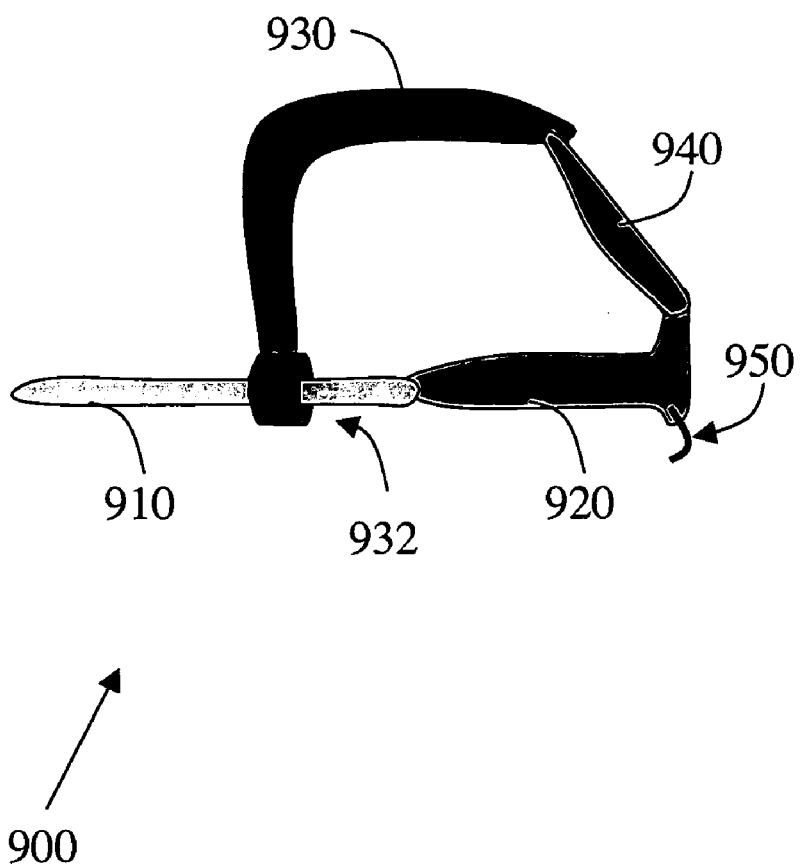
FIGS. 9-12 show different examples of mechanisms capable of engaging and disengaging spine(s), toe(s) or combinations thereof according to the present invention.
Figure 10:
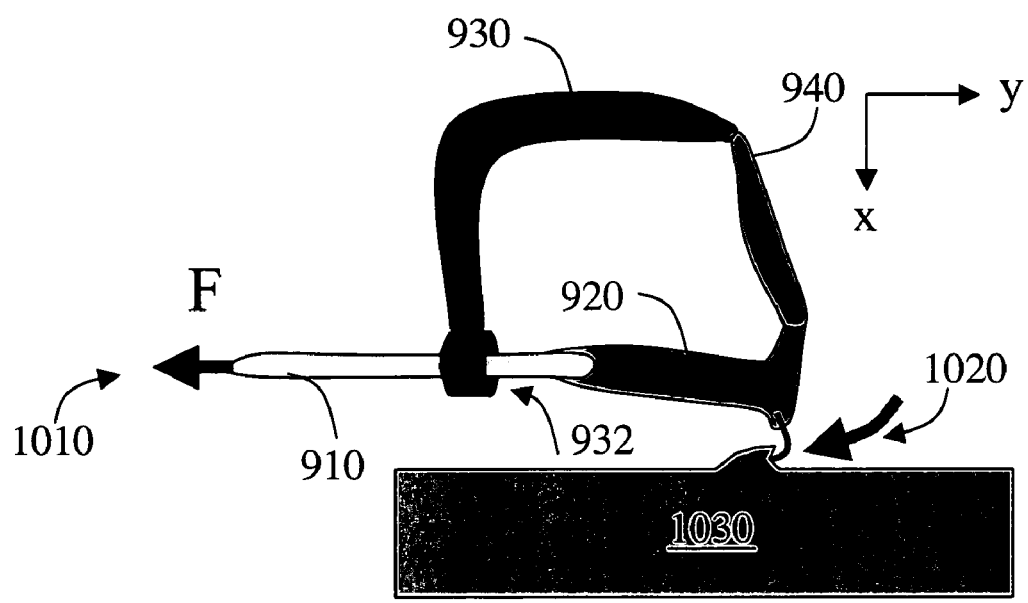
Figure 11:
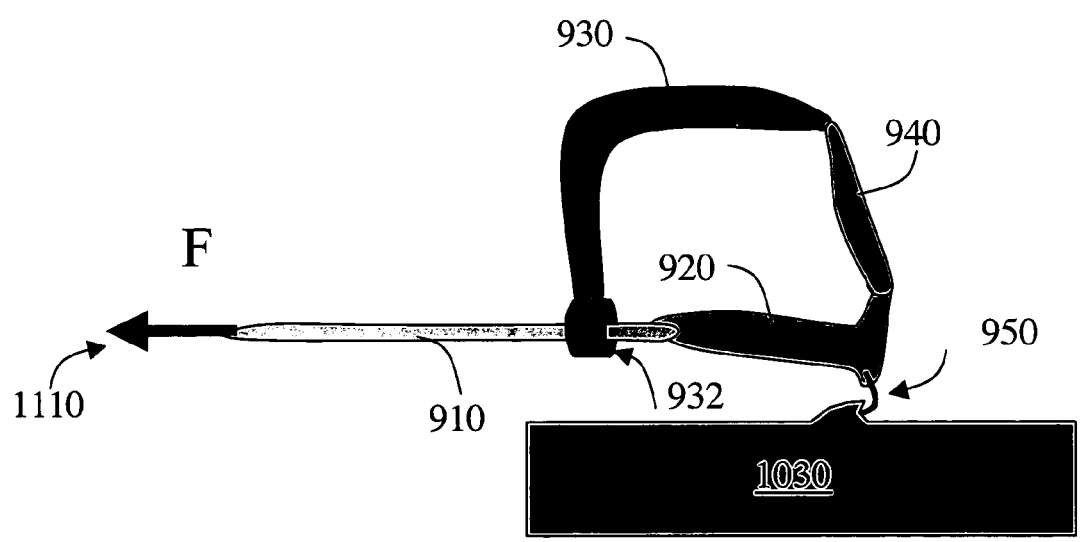
Figure 12:
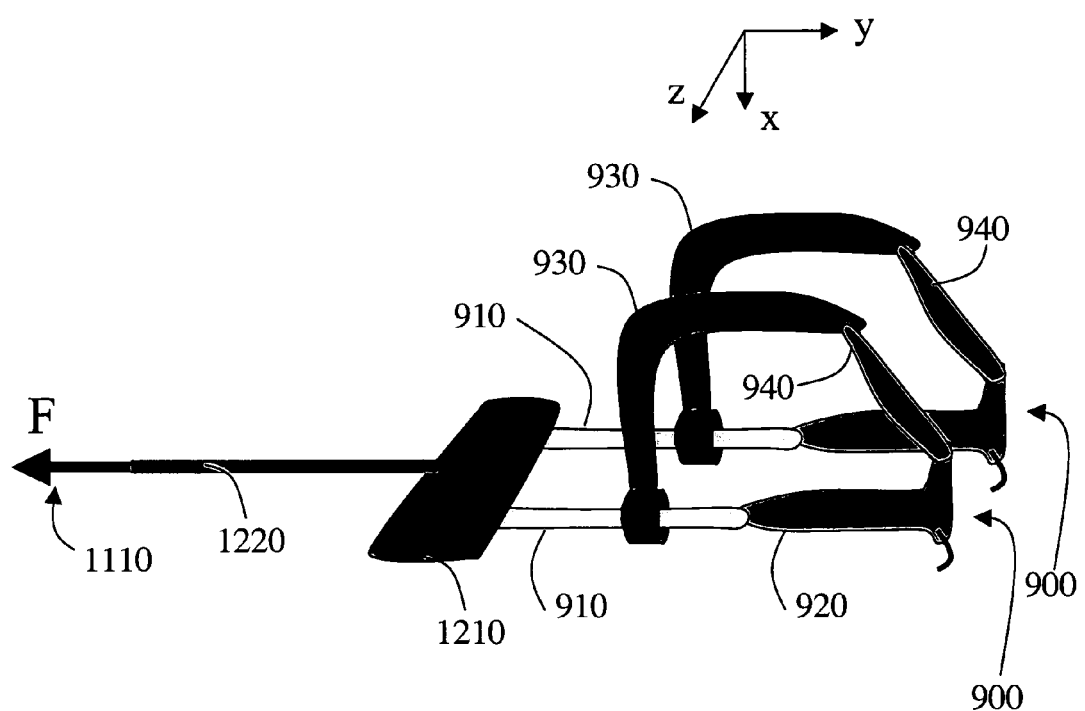

Still another variation pertains to actively sweeping the spines over the surface via a tendon or action while keeping the foot stationary on the surface (or the foot could move, but it could remain stationary), instead of e.g. moving the foot down the wall and allowing the spines to sweep over the surface that way (see FIGS. 9-12). FIGS. 9-11 show an example of toe 900 with a tendon 910 pulling non-compliant part 920 whereby tendon 910 passes through an opening 932 in non-compliant 930 (940 is a compliant part of toe 900; 950 is spine of toe 900). The tendon 910 is used to engage or disengage the spine(s) on toe 910. FIG. 9 shows an un-deflected toe 900. FIG. 10 shows toe 900 deflected downward (+x) and backward (−y) in a direction indicated by arrow 1020 when a force 1010 is applied to tendon 910. The motion of spine 950 has caused it to become hooked onto an asperity on the surface 1030. Non-compliant part 930 can be held in a fixed position with respect to surface 1030, can be moved along surface 1030, or can be moved along surface 1030 during spine engagement. FIG. 11 shows tendon 910 stretched caused by force 1110 because spine 950 is hooked onto an asperity and is not able to move further. FIG. 12 shows an example where each toe 900 is connected to tendon 910, and tendons 910 for each toe are connected (via a connection 1210) together to form another foot-level tendon 1220. This foot-level tendon 1220 can be used to engage or disengage spines 950 (not indicated in FIG. 12, but see FIG. 9). Tendon 1220 could be inextensible. Tendons 910 could be compliant.

All such variations are considered to be within the scope and spirit of the present invention as defined by the following claims and their legal equivalents.

What is claimed is:

1. A device for climbing on a wall surface or clinging onto said wall surface, comprising:

a plurality of compliant linkages neighboring each other and movable with respect to each other;

a plurality of climbing or clinging spines for climbing on said wall surface or clinging onto said wall surface, wherein each of said plurality of compliant linkages comprises in a planar arrangement a first non-compliant structure supporting at least one of said spines and wherein said first non-compliant structure comprises an interior cutout through said planar arrangement, a second non-compliant structure, a first compliant structure with a first end and a second end, and a second compliant structure with a first end and a second end, wherein said first end of said first compliant structure is connected to said first non-compliant structure, wherein said first end of said second compliant structure is connected to said first non-compliant structure, wherein said second end of said first compliant structure is connected to said second non-compliant structure, wherein said second end of said second compliant structure is connected to said second non-compliant structure, wherein each of said spines is capable of moving independently from each other and wherein each of said spines is capable of moving in at least two dimensions; and a pin fixated at a location in the space of said interior cutout of said first non-compliant structure to prevent excessive motion of said first non-compliant structure within said compliant linkage.

2. The device as set forth in claim 1, wherein said spines are tapered and have a tip diameter less than or equal to the diameter of said asperity of said surface.

3. The device as set forth in claim 1, further comprising an under-actuated mechanism capable of engaging and disengaging said spine, said spines, said compliant linkage, said compliant linkages or any combination thereof.

4. The device as set forth in claim 1, further comprising a tendon capable of engaging and disengaging said spine, said spines, said compliant linkage, said compliant linkages or any combination thereof.

5. The device as set forth in claim 1, wherein each of said compliant linkages comprises an overload mechanism.

6. The device as set forth in claim 1, wherein each of said compliant linkages comprises a disengagement mechanism.

7. A climbing robot, comprising:
(a) two or more legs;
(b) each one of said legs having at least one foot;
(c) a plurality of compliant linkages are neighboring each other and movable with respect to each other;
(d) each one of said feet having a plurality of climbing or clinging spines for climbing on said wall surface or clinging onto a wall surface, wherein each of said plurality of compliant linkages comprises in a planar arrangement a first non-compliant structure supporting at least one of said spines and wherein said first non-compliant structure comprises an interior cutout through said planar arrangement, a second non-compliant structure, a first compliant structure with a first end and a second end, and a second compliant structure with a first end and a second end, wherein said first end of said first compliant structure is connected to said first non-compliant structure, wherein said first end of said second compliant structure is connected to said first non-compliant structure, wherein said second end of said first compliant structure is connected to said second non-compliant structure, wherein said second end of said second compliant structure is connected to said second non-compliant structure, wherein each of said spines is capable of moving independently from each other and wherein each of said spines is capable of moving in at least two dimensions; and (e) a pin fixated at a location in the space of said interior cutout of said first non-compliant structure to prevent excessive motion of said first non-compliant structure within said compliant linkage.

8. The climbing robot as set forth in claim 7, wherein said spines are tapered and have a tip diameter less than or equal to the diameter of said asperity of said surface.

9. The climbing robot as set forth in claim 7, wherein said foot comprises an under-actuated mechanism capable of engaging and disengaging said spine, said spines, said compliant linkage, said compliant linkages or any combination thereof.

10. The climbing robot as set forth in claim 7, wherein said foot comprises a tendon capable of engaging and disengaging said spine, said spines, said compliant linkage, said compliant linkages or any combination thereof.

11. The climbing robot as set forth in claim 7, wherein each of said compliant linkages comprises a disengagement mechanism.

\* \* \* \* \*

UNITED STATES PATENT AND TRADEMARK OFFICE
CERTIFICATE OF CORRECTION

PATENT NO. : 8,066,088 B2  
APPLICATION NO. : 11/298306  
DATED : November 29, 2011  
INVENTOR(S) : Alan T. Asbeck Page 1 of 1

It is certified that error appears in the above-identified patent and that said Letters Patent is hereby corrected as shown below:

In the Specification

In Column 1, starting on line 14, please change:

"This invention was supported in part by the Defense Advanced Research Projects Agency (DARPA) under Grant Number N66001-03-C8045. The U.S. Government may have certain rights in the invention."

to

"This invention was made with Government support under contract N66001-03-C-8045 awarded by the Defense Advanced Research Projects Agency. The Government has certain rights in the invention."

Signed and Sealed this
Twenty-second Day of March, 2016

Michelle K. Lee
*Director of the United States Patent and Trademark Office*